No. 780,462. PATENTED JAN. 17, 1905.
W. W. WALTER.
PNEUMATIC TIRE.
APPLICATION FILED AUG. 17, 1904.
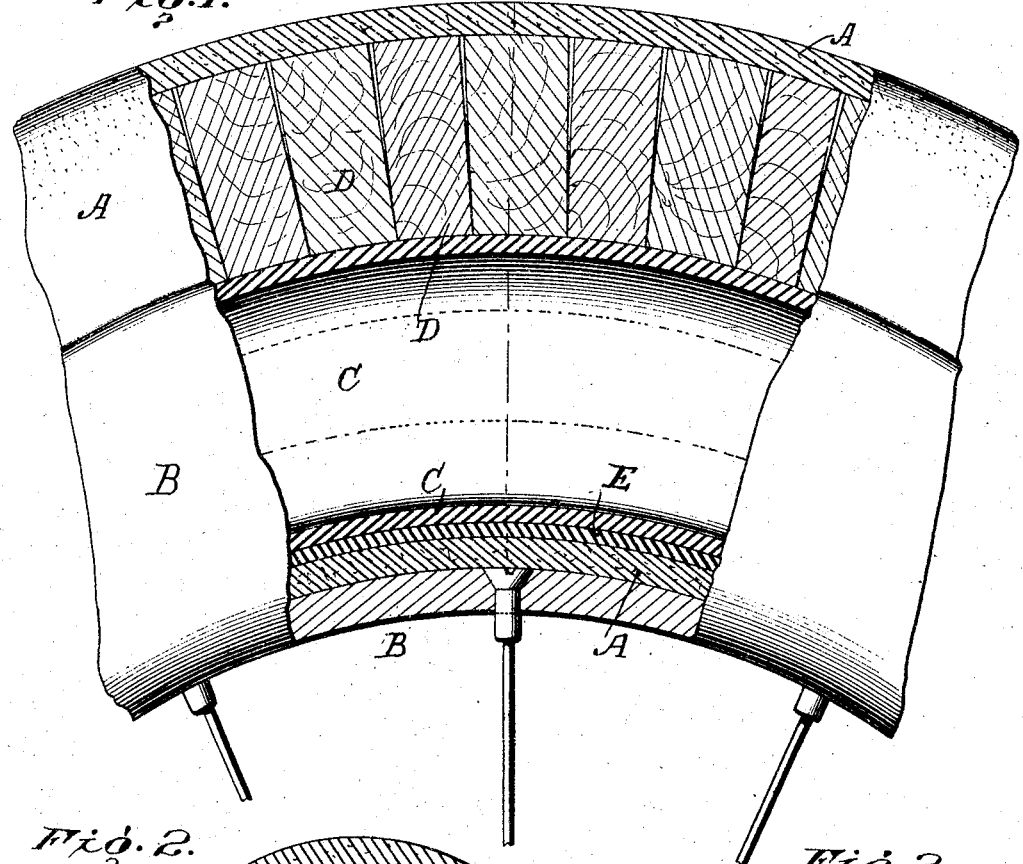
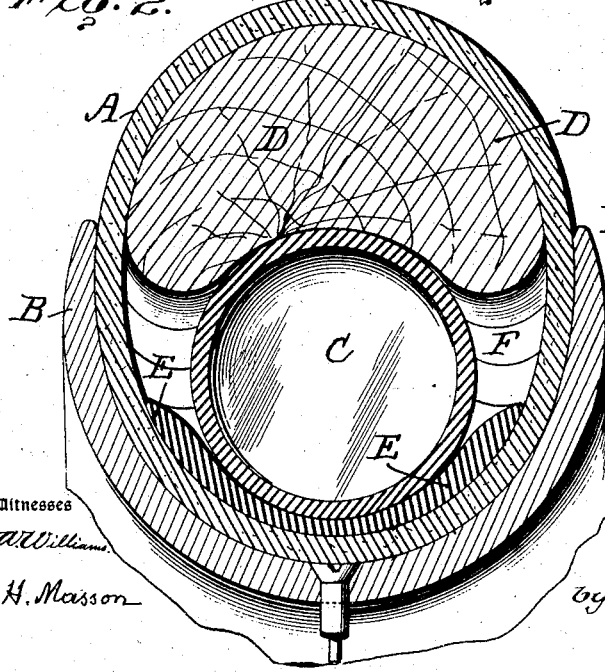
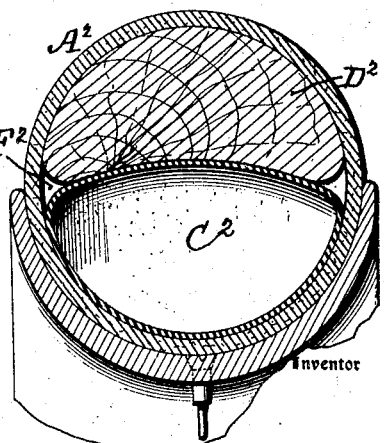
Witnesses
W. A. Williams
H. H. Masson
Inventor
William W. Walter
by Jay D. Miller, Attorney No. 780,462.

Patented January 17, 1905.

UNITED STATES PATENT OFFICE.

WILLIAM W. WALTER, OF AURORA, ILLINOIS, ASSIGNOR OF ONE-HALF TO JAY D. MILLER, OF GENEVA, ILLINOIS.

PNEUMATIC TIRE.

SPECIFICATION forming part of Letters Patent No. 780,462, dated January 17, 1905.

Application filed August 17, 1904. Serial No. 220,994.

*To all whom it may concern:*

Be it known that I, WILLIAM W. WALTER, a citizen of the United States, residing at Aurora, in the county of Kane and State of Illinois, have invented certain new and useful Improvements in Pneumatic Tires, of which the following is a specification.

This invention relates to pneumatic tires mainly intended for heavy vehicles, as automobiles, although suitable also for bicycles.

The objects of the invention are to prevent puncture of the inflatable tube of the tire by cutting or piercing articles encountered on roadways—such as glass, nails, or tacks—and also to provide an inexpensive, non-elastic, and strong support for the inner surface of the outer tube. I attain these objects by the construction illustrated in the accompanying drawings, in which—

Figure 1 is a side view, partly in section, of a portion of a tire constructed in accordance with my invention. Fig. 2 is a transverse vertical section of the same. Fig. 3 is a transverse vertical section of a slightly-modified form of the tire.

In said drawings, A represents the outer rubber-coated tube inclosing all the parts of the tire, which is placed within the rim B of the metal wheel. Within the outer tube A is placed the inflatable tube C in the portion inclosed by the rim B. Between the outer portion of the inflatable tube C and the inner surface of the tube A is placed a series of small slabs D, having substantially parallel sides, as boards; but their periphery is of substantially crescent form, with rounded ends to prevent them from injuring the inner tube or the outer tube. Their convex edge corresponds in form with the inner surface of the tube A, while the concave edge corresponds in form with the outer surface of the inflatable tube C.

As the tubes A and C are substantially cylindrical, but differ greatly in diameter, there is placed within the tube A a cushion E, made of substantially hard rubber, which has its outer surface made with a curvature corresponding with the curvature of the inner surface of the tube A; but the inner surface of the cushion E has its inner surface made with a curvature substantially corresponding with the curvature of the outer surface of the tube C and is thus thinner in its middle portion; but between the ends of the cushion E and the inner surface of the boards D there are left tubular air-chambers F, which allow the tube C to expand laterally within said air-chambers, and consequently allow its top to yield to some extent under the pressure of the inner edges of the boards D, and thereby increase the resilience of the tubes A and C.

The cresent-shaped boards D are made of close-grain, unyielding, and non-elastic wood, basswood being preferred, which materially differ from cork-bark, which has been used as a filling in tires.

To conveniently obtain the cresent-shaped boards D, a long piece of timber is first taken and shaped so that a cross-section thereof will have a cresent shape with rounded ends, as shown in Fig. 2, and then the piece of timber is cut transversely with a saw into sections about an inch wide, more or less. As a portion of the inner periphery of the tube A is generally left open while building the tire, the boards are easily introduced successively before the inner tube C is inflated, as they are free of attachment to the inner or to the outer tube.

In the modification shown in Fig. 3 there is also an outer tube, (shown at $A^2$,) an inflated air-tube $C^2$, a series of cresent-shaped boards $D^2$, and air-chambers $F^2$ on the sides of the air-tube $C^2$; but the inner surface of the tube $A^2$ serves as a cushion or support for the tube $C^2$, as the curvature of the latter corresponds with that of the tube $A^2$ and may be used for light vehicles, as bicycles and other vehicles.

Having now fully described my invention, I claim—

1. In a pneumatic tire, the combination of an outer tube, an inner flexible tube, a series of non-elastic crescent-shaped boards with rounded ends, of unyielding timber free of attachment to the outer or to the inner tube, having their convex edge simply bearing against the interior of the outer tube and their inner concave edge bearing upon the inner tube, air-chambers occupying positions intermediate of the outer tube, the inner tube and the rounded ends of the edges of the boards, with a cushion E thinner in the middle portion and located between a portion of the inner tube and of the outer tube, substantially as described.

2. In a pneumatic tire, the combination of an outer tube, an inner flexible tube, a series of non-elastic crescent-shaped boards having rounded ends, of unyielding timber free of attachment to the outer or to the inner tube, having their convex edge simply bearing against the interior of the outer tube, and their inner concave edge bearing upon the inner tube, air-chambers occupying positions between a portion of the outer tube, the inner tube and the rounded ends of the edges of the boards, substantially as described.

In testimony whereof I affix my signature in presence of two witnesses.

WILLIAM W. WALTER.

Witnesses:
  T. A. AVERY,
  JOHN S. MILLER.